(12) United States Patent
 Sloan et al.

(10) Patent No.: US 10,940,395 B2
(45) Date of Patent: Mar. 9, 2021

(54) METHOD AND DEVICE FOR FANTASY SPORTS AUCTION RECOMMENDATIONS

(71) Applicant: Disney Enterprises, Inc., Burbank, CA (US)

(72) Inventors: J. Nathaniel Sloan, Burbank, CA (US); David Michael Fishel, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 267 days.

(21) Appl. No.: 14/757,978

(22) Filed: Dec. 24, 2015

(65) Prior Publication Data

US 2016/0121224 A1    May 5, 2016

Related U.S. Application Data

(63) Continuation of application No. 13/527,117, filed on Jun. 19, 2012, now abandoned.
(Continued)

(51) Int. Cl.
*A63F 9/00* (2006.01)
*A63F 13/828* (2014.01)
(Continued)

(52) U.S. Cl.
CPC ............ *A63F 13/828* (2014.09); *A63F 13/00* (2013.01); *A63F 13/44* (2014.09); *A63F 13/46* (2014.09);
(Continued)

(58) Field of Classification Search
None
See application file for complete search history.

(56) References Cited

U.S. PATENT DOCUMENTS 6,371,855 B1 * 4/2002 Gavriloff ............... A63F 13/12
                                                            463/1
7,618,312 B1 * 11/2009 Kasten .................. A63F 13/12
                                                            463/7
(Continued)

OTHER PUBLICATIONS

Bales, Jonathan. "Fantasy Football: Using Tiers to Garner Maximum Value on Draft Day". May 20, 2010. <http://thedctimes.com/2010/05/fantasy-football-using-tiers-to-garner-maximum-value-on-draft-day/>.*

*Primary Examiner* — Seng H Lim (74) *Attorney, Agent, or Firm* — Fay Kaplun & Marcin, LLP (57) ABSTRACT

A device and method groups sport players into tiers for a fantasy sports auction and generates bid recommendations. The method includes receiving at least one parameter value for each of a plurality of sport players. The method includes determining a score value for each of the sport players as a function of the at least one parameter value. The method includes determining a corresponding tier value of a plurality of tier values for each of the sport players, each of the tier values being indicative of a respective range of score values. The method includes providing first player data for one of the plurality of sport players including at least identity data and the corresponding tier value. The method includes accepting the nomination of a second player, and generating recommended bid data using the at least one parameter value, and optionally modifying the recommendation thereupon.

16 Claims, 6 Drawing Sheets

Related U.S. Application Data (60) Provisional application No. 61/500,018, filed on Jun. 22, 2011.

(51) Int. Cl.
*A63F 13/79* (2014.01)
*A63F 13/85* (2014.01)
*A63F 13/00* (2014.01)
*A63F 13/44* (2014.01)
*A63F 13/46* (2014.01)
*A63F 13/798* (2014.01)

(52) U.S. Cl.
CPC ............ *A63F 13/79* (2014.09); *A63F 13/798* (2014.09); *A63F 13/85* (2014.09); *A63F 2300/558* (2013.01); *A63F 2300/575* (2013.01)

(56) References Cited

U.S. PATENT DOCUMENTS

| | | | | |
|---|---|---|---|---|
| 7,699,707 B2 * | 4/2010 | Bahou | ................... | A63F 13/12 463/1 |
| 7,988,560 B1 * | 8/2011 | Heller | ................... | A63F 9/24 463/40 |
| 8,099,182 B1 * | 1/2012 | Kasten | ................... | A63F 13/65 463/42 |
| 8,353,772 B2 * | 1/2013 | Callery | ................... | G07F 17/3276 463/42 |
| 2004/0110552 A1 * | 6/2004 | Del Prado | ................... | A63F 13/12 463/4 |
| 2007/0054718 A1 * | 3/2007 | Del Prado | ................... | A63F 13/792 463/1 |
| 2008/0234048 A1 * | 9/2008 | Gottlieb | ................... | G06Q 30/0601 463/42 |
| 2008/0281974 A1 * | 11/2008 | Slothouber | ................... | G06F 17/30867 709/229 |
| 2009/0023495 A1 * | 1/2009 | Koustas | ................... | G06Q 50/34 463/25 |
| 2009/0325685 A1 * | 12/2009 | Webb | ................... | A63F 13/12 463/25 |
| 2011/0034225 A1 * | 2/2011 | Butz, Jr. | ................... | A63F 13/12 463/4 |
| 2011/0053684 A1 * | 3/2011 | Attwood | ................... | G07F 17/32 463/28 |
| 2011/0076656 A1 * | 3/2011 | Scott | ................... | G09B 7/00 434/236 |
| 2011/0319171 A1 * | 12/2011 | Ngozika | ................... | A63F 13/798 463/42 |
| 2012/0071219 A1 * | 3/2012 | Belmarch | ................... | A63F 13/12 463/2 |
| 2012/0283858 A1 * | 11/2012 | Lapadula | ................... | A63F 13/828 700/93 |
| 2012/0330444 A1 * | 12/2012 | Sloan | ................... | A63F 13/00 700/92 |

* cited by examiner

METHOD AND DEVICE FOR FANTASY SPORTS AUCTION RECOMMENDATIONS

PRIORITY CLAIM

This invention claims priority to U.S. Provisional Application Ser. No. 61/500,018 entitled "Automated Fantasy Draft Player Recommendations", filed Jun. 22, 2011, the disclosure of which is incorporated, in its entirety, herein.

INCORPORATION BY REFERENCE

The entire disclosures of U.S. patent application Ser. No. 13/331,894, filed Dec. 20, 2011, U.S. patent application Ser. No. 12/760,277, filed Apr. 14, 2010, U.S. patent application Ser. No. 12/760,422, filed Apr. 14, 2010, U.S. patent application Ser. No. 12/760,384, filed Apr. 14, 2010, and U.S. patent application Ser. No. 12/760,269, filed Apr. 14, 2010, including the specification, claims, and abstract, all of which share at least one common inventor and are assigned to a common assignee with the present application, are hereby expressly incorporated by reference herein.

FIELD OF THE INVENTION

This present invention pertains to the field of fantasy sports games. The exemplary embodiments relate to a method and system for providing recommended bid amounts for use during an auction-style draft, while also breaking players up into tiers to inform a user's player selection process.

BACKGROUND INFORMATION

A fantasy sports game is a game where users act as managers or owners of simulated sport teams called "fantasy teams," where each team comprises a number of "players." Thus, the term "owner" is used to refer to a participant in the fantasy sports game. An owner may be a natural person or a computer-controlled opponent. A "user" is a fantasy owner who is also a natural person. Thus, the term "user" and "owner" are used interchangeably in their roles in the fantasy sports game. In contrast, the term "player" refers to one of the selectable fantasy characters. In certain fantasy sports games, each player corresponds to an athlete in a professional sport league.

Features for conventional fantasy sports games are already known in the art. In a first example, a player evaluation system uses historical data to predict player performance through the end of the season using a blending function. The system is also applied in a draft context by assigning average performance values to the slots on the owner's team that have not yet been filled with players yet to be drafted. In calculating team points, one version weighs certain statistics more heavily than others.

Conventional recommendation engines are also known in the art. In one conventional recommendation engine, player analyzing software queries a sports statistics system to analyze the relevant players and delivers the analysis to a roster move recommending software component that delivers to the user roster move recommendations based on the results of the player analysis. The player analysis may be based on actual statistics or projected statistics.

Some fantasy sports owners, when participating in an auction-style draft, will compute players' auction values before the draft and then approximate the necessary adjustments as the draft goes along. However, this requires that the owners perform many manual calculations with regard to the entire pool of available players. This is often very time-consuming and may result in poor decisions, particularly when a player is overlooked but would otherwise be optimal to be nominated.

Figure 1:
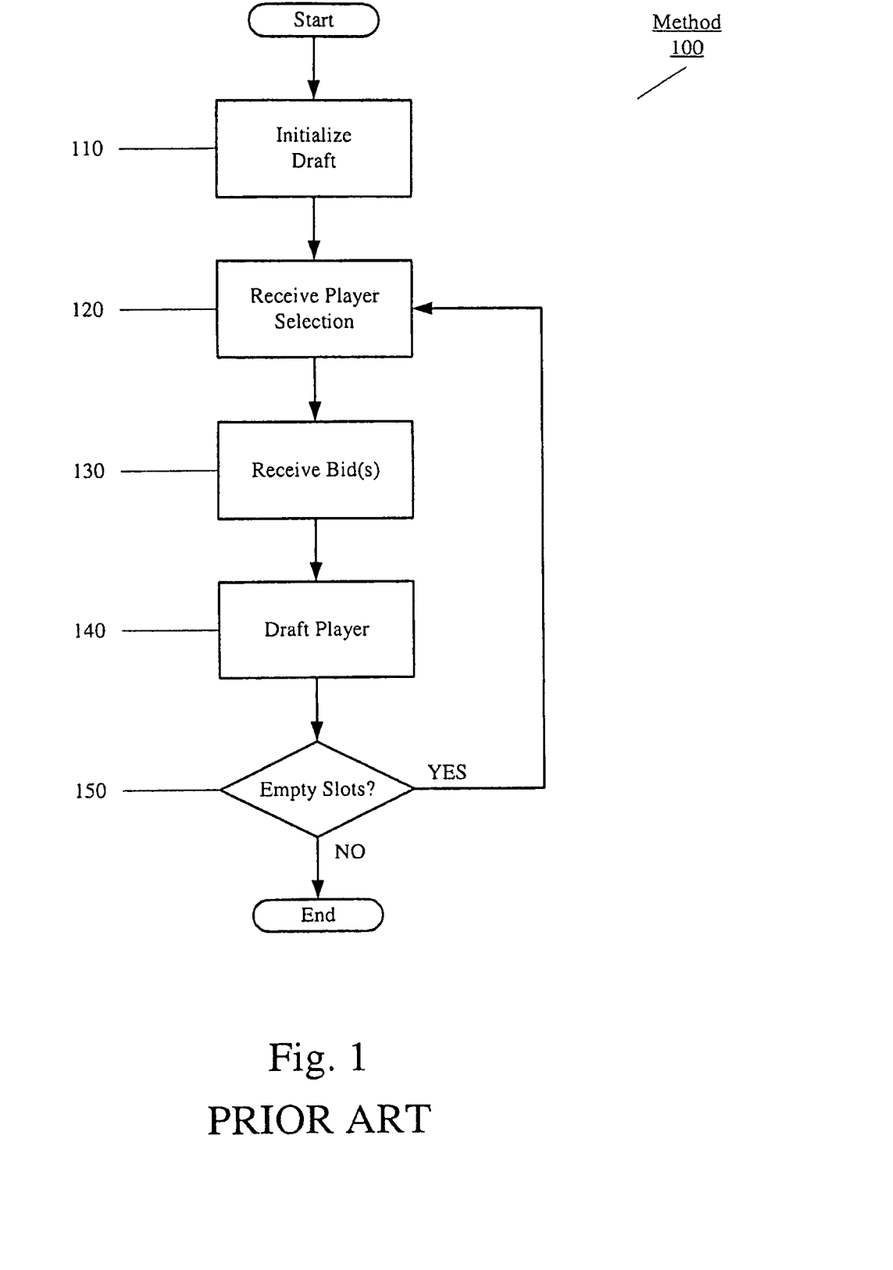
FIG. 1 shows a conventional method for executing a fantasy sports application to draft players, where the method depicted is an auction-style draft.

FIG. 1 shows a method 100 for executing a fantasy sports application to draft players as is known in the art. Specifically, the method 100 relates to the fantasy sports application when players are selected in a conventional auction format. Thus, a user is provided a predetermined, overall budget with which to "bid" for select players; the user who provides the highest "bid" for a particular player receives that player for the owner's team. In step 110, the draft is initialized. In step 120, an owner or user selects a player and the host executing the fantasy sports application receives the selection. In step 130, the owner or user provides a bid on the player and the host receives the bid.

In step 130, further owners or users who are also interested in drafting the selected player provide bids and the host receives the respective bids. Thus, in step 140, the host determines the user who provided the highest bid, and that user drafts the player. In step 150, a determination is made whether there are empty slots for a respective position related to the sport in the fantasy sports application. If the determination in step 150 indicates that more auctions are to be performed since there are still empty slots, the method 100 returns to step 120 where further selections are received. If the determination in step 150 indicates that no more slots are empty, the method 100 ends.

Thus, within the conventional auction format for selecting a fantasy sports team, the users are required to determine, manually, the players on which to bid, as well as the amount to bid for each of the players, as all of the available players are amassed into a common pool of players. Furthermore, the conventional system does not provide the user with easily-understood information regarding the relative value of the several players in the game, making it difficult for users to determine, in the short period of time provided in an online auction, whether or not a given player would be a worthy addition to the team.

DETAILED DESCRIPTION

The present invention relates to a method and device for grouping sport players into tiers for a fantasy sports auction and generating bid recommendations. The method comprises receiving at least one parameter value for each of a plurality of sport players; determining a score value for each of the sport players as a function of the at least one parameter value; determining a corresponding tier value of a plurality of tier values for each of the sport players, each of the tier values being indicative of a respective range of score values; and providing first player data for one of the plurality of sport players including at least identity data and the corresponding tier value; accepting the nomination of a second player, and generating a recommended bid value, using the at least one parameter value, and optionally modifying that recommendation based upon the tier value of the second sport player.

The exemplary embodiments may be further understood with reference to the following description of the exemplary embodiments and the related appended drawings, wherein like elements are provided with the same reference numerals. The exemplary embodiments are related to systems and methods for providing recommendations for players who are drafted in a fantasy sports application in which the drafting is performed using an auction. Specifically, the players are grouped into tiers in which the players of a tier are statistically similar. Furthermore, the recommendations relate to a bidding amount for a player being auctioned and whether a potential bid is recommended. While drafting a fantasy sports team, a fantasy team owner must consider a multitude of factors to determine the best possible selection. The exemplary embodiments of the present invention assist in the drafting by providing a set of recommendations that help guide the decision-making process, in a manner useful during a (potentially time-limited) draft.

Initially, it is noted that the terminology used herein for the exemplary embodiments of the present invention are consistent with what was described above. Accordingly, the terms of an "owner" and a "user" may be used interchangeably to refer to a common person or computer who runs a fantasy team. On the other hand, the term of "a player" relates to an actual sport athlete participating in the respective live sport of the fantasy sports application.

Figure 2:
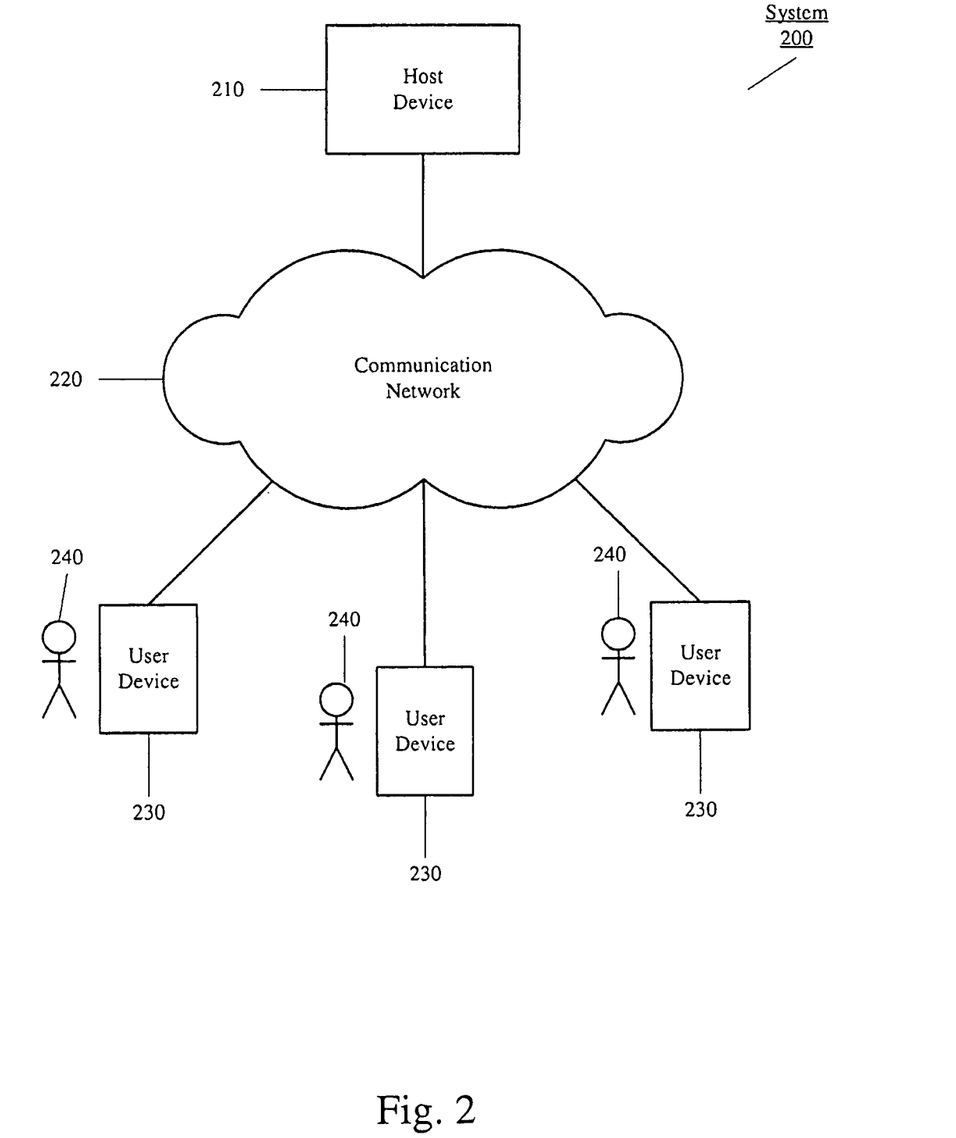
FIG. 2 shows a system in which a fantasy sports application is executed according to an exemplary embodiment of the present invention.

The fantasy sports application may be an interface provided on a client. Accordingly, the client may be executed on an electronic device that is configured with a transceiver to connect the device to a network. FIG. 2 shows a system 200 in which the fantasy sports application may be executed. As shown in FIG. 2, a plurality of users 240 may each have a user device 230 that is configured to communicate with a communication network 220, for example, via a wired or wireless connection. The network 220 may include or connect to a host device 210 that is configured to execute the fantasy sports application. As will be described in further detail below, the fantasy sports application may be configured to provide recommendations to the users 240. Accordingly, the host 210 may be connected or have access to a plurality of different sources of data that is used to provide the recommendations. It should be noted that the discussed embodiment with three users 240 and respective user devices 230 is only exemplary. Those skilled in the art will understand that the system 200 may include any number of users 240 and user devices 230 who participate in the fantasy sports application.

The network 220 may be any type of network configuration capable of connecting the plurality of user devices 230. In a first exemplary embodiment of the present invention, the host 210 may be a website. Accordingly, the network 220 may be the Internet (e.g., WAN). In this exemplary embodiment, the network 220 may include a plurality of network components such as a server, a database, a network management arrangement, a plurality of access points, etc. In a second exemplary embodiment of the present invention, the host 210 may be an electronic device (e.g., server terminal) operated by a user. Accordingly, the network 220 may be a local area network (LAN). In this exemplary embodiment, the network 220 may include a hub that is configured to connect the user devices 230 to the host 210 for data to be exchanged thereamong.

Figure 3:
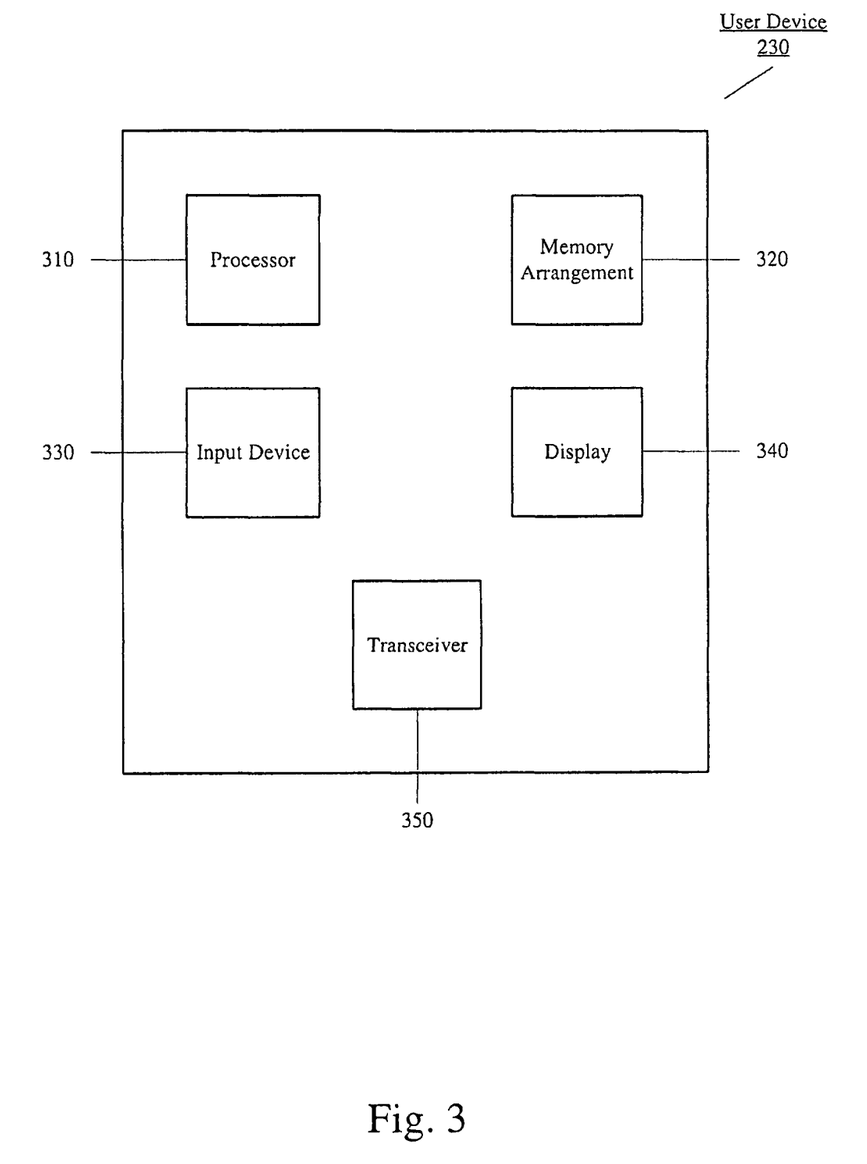
FIG. 3 shows a user device that connects to a host of FIG. 2 for the fantasy sports application according to an exemplary embodiment of the present invention.

FIG. 3 shows one of the user devices 230 that connects to the host 210 and shows the interface for the fantasy sports application according to an exemplary embodiment of the present invention. The user device 230 may be any electronic device such as a computer terminal, a laptop, a personal digital assistant, a tablet, a cellular phone, etc. The user device 230 may also operate using any operating system such as Windows, Mac OS, Linux, Android, iOS, etc. That is, the recommendation engine according to the exemplary embodiments of the present invention may be adapted for any platform used by the user device 230. It should also be noted that the recommendation engine according to the exemplary embodiments of the present invention may also be adapted to any fantasy sports game that is run on the host 210. The user device 230 may include a processor 310, a memory arrangement 320, an input device 330, a display 340, and a transceiver 350. It should be noted that the user device 230 may include further components; for example, when the user device is a portable electronic device, a power supply may be included. It should also be noted that the input device 330 and the display 340 may be embodied together, for example, in a touch screen configured to perform both functionalities.

The processor 310, the memory 320, the input device 330, the display 340, and the transceiver 350 may all provide conventional functionalities for the user device 230. For example, the processor 310 may execute the interface for the fantasy sports application. In another example, the processor 310 may execute a browser application in which the fantasy sports application is executed thereon. The transceiver 350 may exchange data through the network 220 with the host 210, in particular to receive data related to the fantasy sports application as well as the recommendations generated by the recommendation engine, as will be discussed in further detail below.

Figure 4:
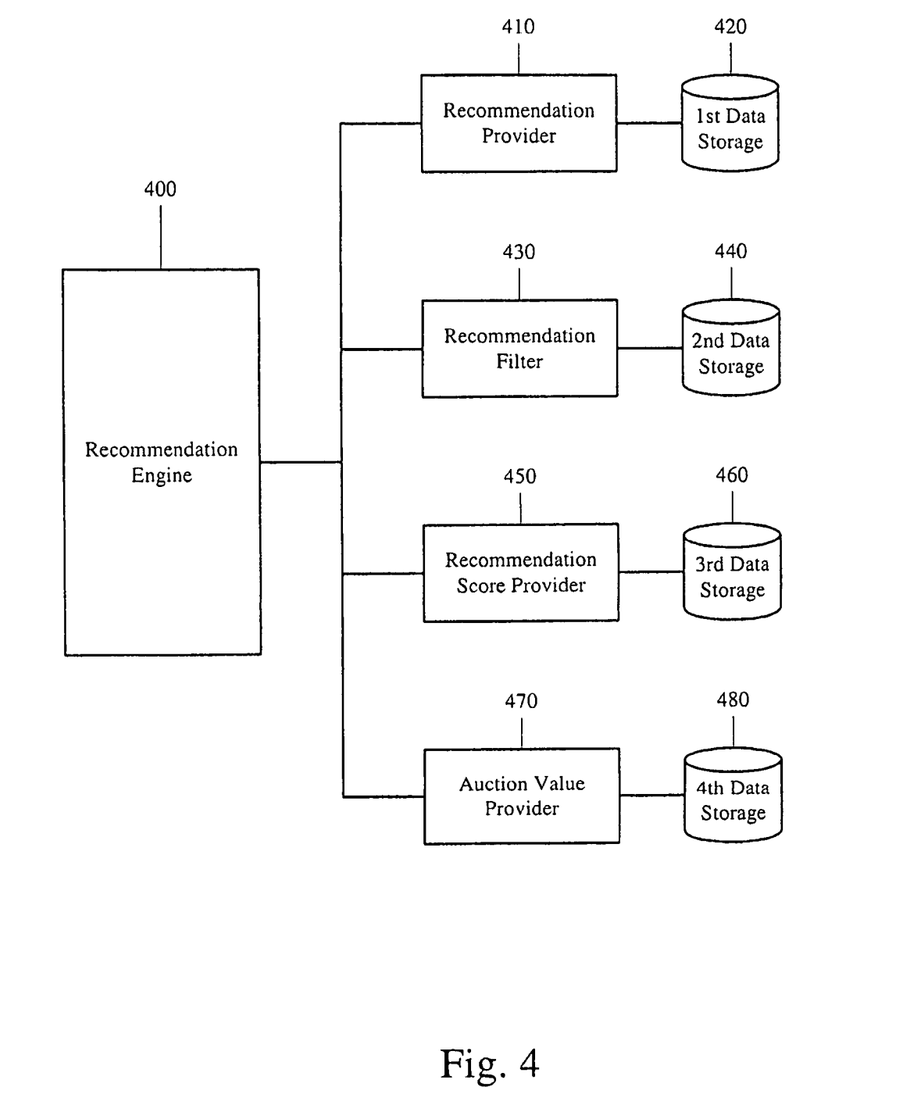
FIG. 4 shows a recommendation engine according to an exemplary embodiment of the present invention.

While performing the draft as described in one of the methods above, the host 210 may include a recommendation engine that provides one or more recommendations for the users to determine an optimal selection of one or more players. FIG. 4 shows a recommendation engine 400 that is configured to provide the recommendations according to an exemplary embodiment of the present invention. The recommendation engine 400 may be incorporated as part of the host 210 or may be a separate utility of the fantasy sports application. The recommendation engine 400 may also be configured to access or be connected to a plurality of data sources. For example, the data may be related to past ranking values of a player as a function of performance from previous seasons. In another example, the data may be related to current ranking values of a player as assessed by other leagues in the sport of the fantasy sports application. In yet another example, the data may be related to ranking values as determined by "experts" in the sport. It should be noted that there are many other sources of data that provide ranking values of players that the recommendation engine may consider prior to generating the recommendations for the users 240.

For the recommendation engine 400 to ultimately generate recommendations, the recommendation engine 400 may utilize a plurality of processors that provide data thereto. Specifically, each of the plurality of processors may be sources of analyzed data that the recommendation engine 400 uses to generate the recommendations. As illustrated in FIG. 4, the plurality of processors may include a recommendation provider 410 connected to a first data storage 420 providing a first set of analyzed data, a recommendation filter 430 connected to a second data storage 440 providing a second set of analyzed data, a recommendation score provider 450 connected to a third data storage 460 providing a third set of analyzed data, and an auction value provider 470 connected to a fourth data storage 480 providing a fourth set of analyzed data. The first, second, third, and fourth analyzed data may be received by the recommendation engine 400. Because the recommendation engine is designed with multiple componentized interfaces, additional ranking techniques and weights to the system may be added easily by, e.g., an administrator. If required, further processors may also be incorporated for the recommendation engine 400. By receiving the first, second, third, and fourth analyzed data from the plurality of processors listed above, the recommendation engine 400 may further analyze the analyzed data to generate the recommendations according to the exemplary embodiments of the present invention. Note that the separation into various processors 410, 430, 450, and 470, and various data storages 420, 440, 460, 480, is merely exemplary. Those skilled in the art will understand that any of these processing functions may be subcomponents of a single processor, and that any number of the data storages may be physically maintained in a single unit.

According to the exemplary embodiments of the present invention, the recommendation engine 400 may separate players into tiers to subsequently display the player data (e.g., on the display 340) such as name and position with a corresponding tier value that is determined. The recommendation engine 400 may also be configured to generate a list of players arranged by the tier values. The tiers may be based upon a variety of factors. In a preferred exemplary embodiment of the present invention, the tiers may be based upon projected statistics such as an expected score players in the tier are calculated to provide to the team of the owner. Accordingly, players having projected statistics within a predetermined range may be grouped into a particular tier. In a second example, the tiers may be based upon past statistics such as scores that the players have produced in the last year, in the past several years, since entering the professional league, etc. Accordingly, players having prior statistics within a predetermined range may be grouped into a particular tier.

As discussed above, the recommendation engine 400 may receive data related to the players available in the draft from a variety of sources. The recommendation engine 400 may receive this data for consideration in determining how the players are to be arranged into the different tiered groups. As discussed above, the fantasy sports application may be different from one league to another in a variety of ways such as which factors are considered in determining a score for the team of the owner or for each player of the team. Accordingly, the recommendation engine 400 may be configured to determine the parameters that the league with which the owner is associated utilizes for calculating the scores.

Upon receiving the data of the players and the parameters for the score calculations, the recommendation engine 400 may initially determine a score value for the sport players to determine the tier in which the player is to be grouped. The recommendation engine may further separate the players according to a playing position within the respective sport (e.g., in football, the playing positions may be running back, quarterback, wide receiver, tight end, etc.) to further narrow an ultimate recommendation. For example, in a most simplified example, if the group of players relates to running backs when the fantasy sports application is football, the parameter may be projected touchdowns that the player is expected to score during the season. The recommendation engine 400 may generate thresholds indicating a range of score values that determine whether a player is to be placed into a respective tier so that a player having a greater number than the threshold is placed into a higher tier whereas a player having a lower number than the threshold is placed into a lower tier group. Accordingly, depending on the number of tiered groups that the recommendation engine 400 is to generate, there may be n−1 thresholds separating the tiered groups, n being the total number of tiered groups. According to a preferred exemplary embodiment of the present invention, the thresholds may be generated dynamically. For example, as is known the art, the method of least squares may be used to determine the n points $i_1, i_2, \ldots, i_n$ which best characterize the data; these n points then define n−1 thresholds $t_1, t_2, \ldots, t_{n-1}$ where each threshold $t_x$ is the midpoint of two successive points $i_x$ and $i_{x-1}$. However, it should be noted that the thresholds may also be generated in a predetermined manner to separate the players into the tiers where the n−1 thresholds are provided by calculation before the beginning of the draft.

It should be noted that the above example of the running back and expected touchdowns scored is only exemplary. The recommendation engine 400 may be configured to consider a wide variety of parameters that the league is designed to include in the score calculation. For example, the recommendation engine 400 may further consider receptions, yards from scrimmage, yards after catch, fumbles, etc. Through consideration of all the parameters the league is designed to use, the recommendation engine may generate thresholds for expected scores that the players are predicted to provide. Accordingly, the recommendation engine 400 may generate tiered groups as a function of the predicted score, rather than for only a single parameter.

According to the exemplary embodiments of the present invention, the recommendation engine 400 may further provide recommendations to the users with regard to drafting a player during an auction type draft. Furthermore, the recommendation engine 400 may utilize the tier groups previously generated prior to running the draft to determine the recommendations. As will be described in further detail below, the recommendation engine 400 may generate the recommendations as whether or not an owner should offer a bid (e.g., an affirmative indication value being 1 and a negative indication value being 0), a maximum bid value for a player up for bid, or both. The recommendations that are generated may be shown to the owners, for example, via the display 340. Thus, when the fantasy sports application includes a graphical user interface, each player may be displayed with the associated recommendations, a window may be created for each player of interest (e.g., a pop up window when a player name is hovered over by a user input device such as a mouse), an input may be received by the owner that indicates a request for the recommendations on the interface, etc.

In a first exemplary embodiment of the present invention, the recommendation engine 400 may determine an initial bid value for a player. For example, through the data received by the plurality of processors of FIG. 4, in particular the auction value provider 470, the recommendation engine 400 may calculate a reasonable bid value should the owner wish to draft that player. This calculation may be based upon any repeatable mechanism desired. In a preferred embodiment of the present invention, this reasonable bid value is based upon the amount of money remaining for the team in question, the number of players already drafted to the team in question, the total number of teams in the league and the composition of each, the total amount of money available to other players, the projected value of the player, scoring rules for the league, and other related factors. As discussed above, the owner may receive this initial bid value before any bidding is done for this player. The initial bid value may also be based upon the tier of the group in which the player is associated. For example, a higher tier group may have an initial bid value that is greater than a lower tier group. The recommendation engine 400 may adjust the initial bid value of the player as a function of the tier group. In a preferred embodiment of the present invention, this tier value may be an additional piece of data used in the calculation of a reasonable bid value.

The recommendation engine 400 may then determine whether players in the same tier remain undrafted, and, if so, how many such undrafted players exist. The recommendation engine 400 may then adjust the bid value for the player and eventually the recommendation for that player accordingly. For example, in the highest tier group, the number of players may be relatively small; if the owner does not have any players from this tier group, the recommendation engine 400 may increase the potential bid value so that the owner has a higher probability of acquiring the player. The recommendation engine 400 may utilize a first threshold value, such as a percentage of players in the group remaining, to determine whether the bid value should be decreased. For example, if the tier group has a number of remaining players greater than the first threshold, the recommendation engine 400 may determine that the likelihood that the owner is able to draft a player from this tier group is still very high; consequently, the recommended bid value may be lowered.

If the recommendation engine 400 finds that a player is in a very low tier, it may determine that there is no value in bidding on that player whatsoever, because another, essentially equivalent (or better) player will be freely available at the end of the draft; therefore, a recommendation not to bid may be made.

If the percentage of remaining players in the tier group is below the first threshold, the recommendation engine 400 may determine that the initial bid value should be maintained or even increased. For example, if the percentage of the remaining players in the tier group is within a given range, the recommendation engine 400 may determine that the initial bid value is the optimal amount that the owner should bid for the player, but if the percentage is particularly low (e.g., if only a single player at a high tier remains), the recommended bid may be increased. It should again be noted that the recommendation engine 400 may include a variety of other factors to make this determination. For example, the recommendation engine 400 may review the current roster of the team of the owner. This data may indicate that the recommendation engine 400 should increase or lower the initial bid value. In another example, the recommendation engine 400 may consider the remaining assets available for bidding, particularly as a function of the number of remaining players to be bid or the number of empty slots. If the recommendation engine 400 determines that this player is the last or one of the last remaining players in the tier group, the recommendation engine 400 may be configured to increase the recommended bid value to increase the likelihood that the owner is able to draft the player should the other circumstances surrounding the team dictate. That is, the recommendation engine 400 may utilize a second threshold value, such as a further percentage of players in the group remaining. At this stage, the recommendation engine 400 may provide an adjusted bid value to the owner. This threshold value may be built directly into the system or set by an administrator.

The recommendation engine 400 may be configured to further incorporate previous bids placed on the player in the calculation to provide a recommendation. For example, if a current bid is already made on the player, the recommendation engine 400 may compare the current bid with the adjusted bid values previously determined. Accordingly, the recommendation engine 400 may be configured to determine whether or not to recommend that the owner bid on the player. For example, if the recommendation engine 400 has considered all the other factors of the owner's team, the recommendation engine 400 may determine that if the current bid is greater than the adjusted bid, a bid by the owner is not recommended, or vice versa. On the other hand, if no bids have been made on the player and the recommendation engine 400 determines that the player should be drafted, the recommendation engine 400 may recommend placing a bid at the adjusted bid value that was previously determined.

In a second exemplary embodiment of the present invention, the recommendation engine 400 may determine the bid value of the player dynamically as the player is eventually placed for auction. For example, the recommendation engine 400 may generate an initial bid value based upon the projected statistics of the player regardless of the tier group (as well as the previously described manner of generating the initial bid value). In another example, the recommendation engine 400 may not generate a recommended bid value until a bid has been placed upon a given player by another owner.

The recommendations may be shown to the owners in a variety of manners. In a first example, as discussed above, the player's name and the associated tier group may be shown. In a second example, when the bid values are to be displayed, the player's name and a range of recommended bid values may be displayed. In a third example, when the recommendation as to whether or not to bid is to be shown, simplified graphic may be used such as a strikeout through the player's name to indicate a recommendation to not bid on the player or a highlight in green lettering to indicate a recommendation to bid on the player. In a fourth example, any combination of the above may be shown to the user. Those skilled in the art will appreciate that this is but a small subset of the variety of mechanisms by which this information may be conveyed, and that the most appropriate display may vary depending upon the remainder of the user interface and other factors.

Figure 5:
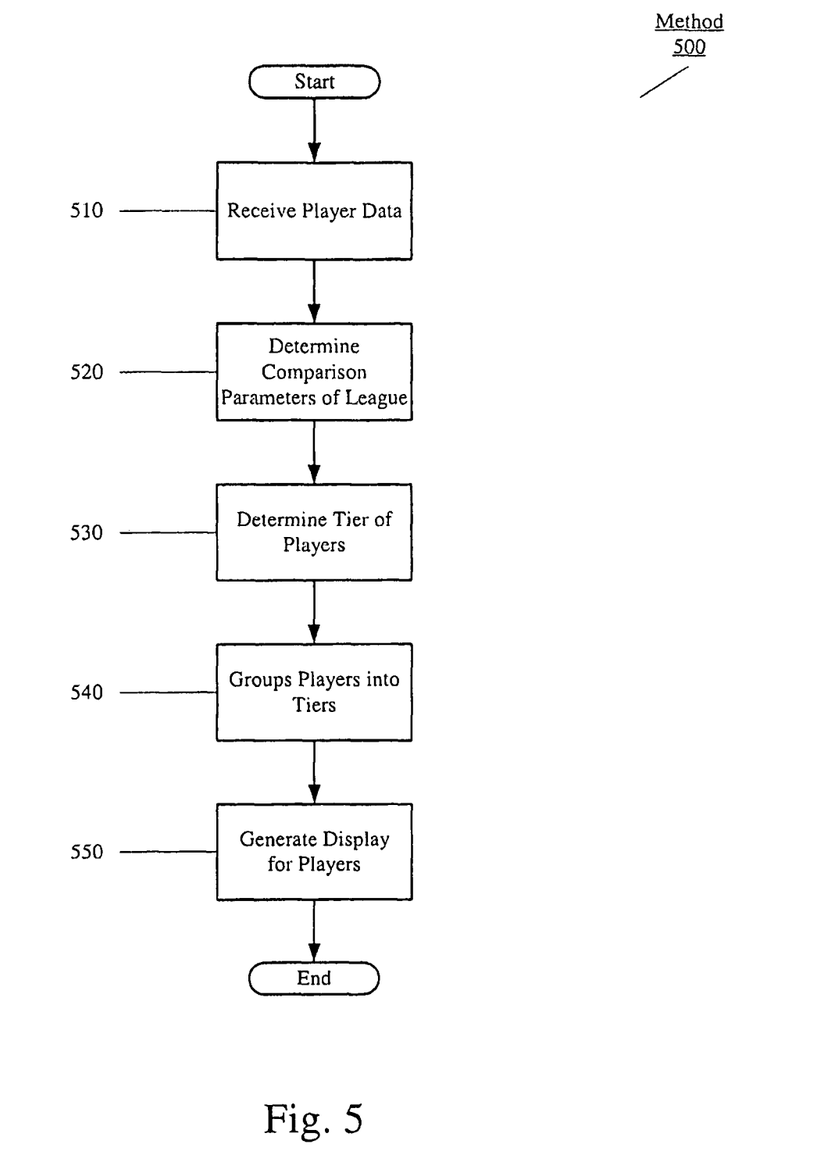
FIG. 5 shows a method for generating a plurality of tiers of players in order to provide recommendations for a fantasy sports auction according to an exemplary embodiment of the present invention.

FIG. 5 shows a method 500 for generating a plurality of tiers of players in order to provide recommendations for a fantasy sports application according to an exemplary embodiment of the present invention. The method 500 will be described with reference to the recommendation engine 400 of FIG. 4.

In step 510, the recommendation engine 400 receives player data. As discussed above, the recommendation engine 400 may receive player data from a variety of sources such as the processors 410, 430, 450, 470, each, having access to a data storage 420, 440, 460, 480, respectively. The player data may relate to at least one parameter value as discussed above. In step 520, the recommendation engine 400 may further determine the parameters that a league utilizes for calculating scores for players and/or teams. As discussed above, each league may use different parameters in the scoring. Therefore, by determining the correct comparison parameters for the league, the recommendation engine 400 is configured to provide optimal recommendations according to the needs of the particular owner.

In step 530, the recommendation engine 400 utilizes the player data to determine the tier of the player. As discussed above, score values of the players may be determined to further determine the tier of the players. For example, each tier may include a range of projected statistic values (e.g., from the analyzed data of the processors 410, 430, 450, 470 that is further analyzed by the recommendation engine 400) that a player is expected to provide, thereby implying a threshold value between adjacent tiers. The recommendation engine 400 may use the projected statistics from the player data to determine the tier of the player. In step 540, the recommendation engine 400 may group the players into the tiers determined in step 530. Thus, in step 550, the recommendation engine 400 may generate respective displays for the players including player data such as name data and position data and further include the respective tier value. The recommendation engine may further generate a list of the players in the tier value that may be made available to the owners prior to and during the draft.

Figure 6:
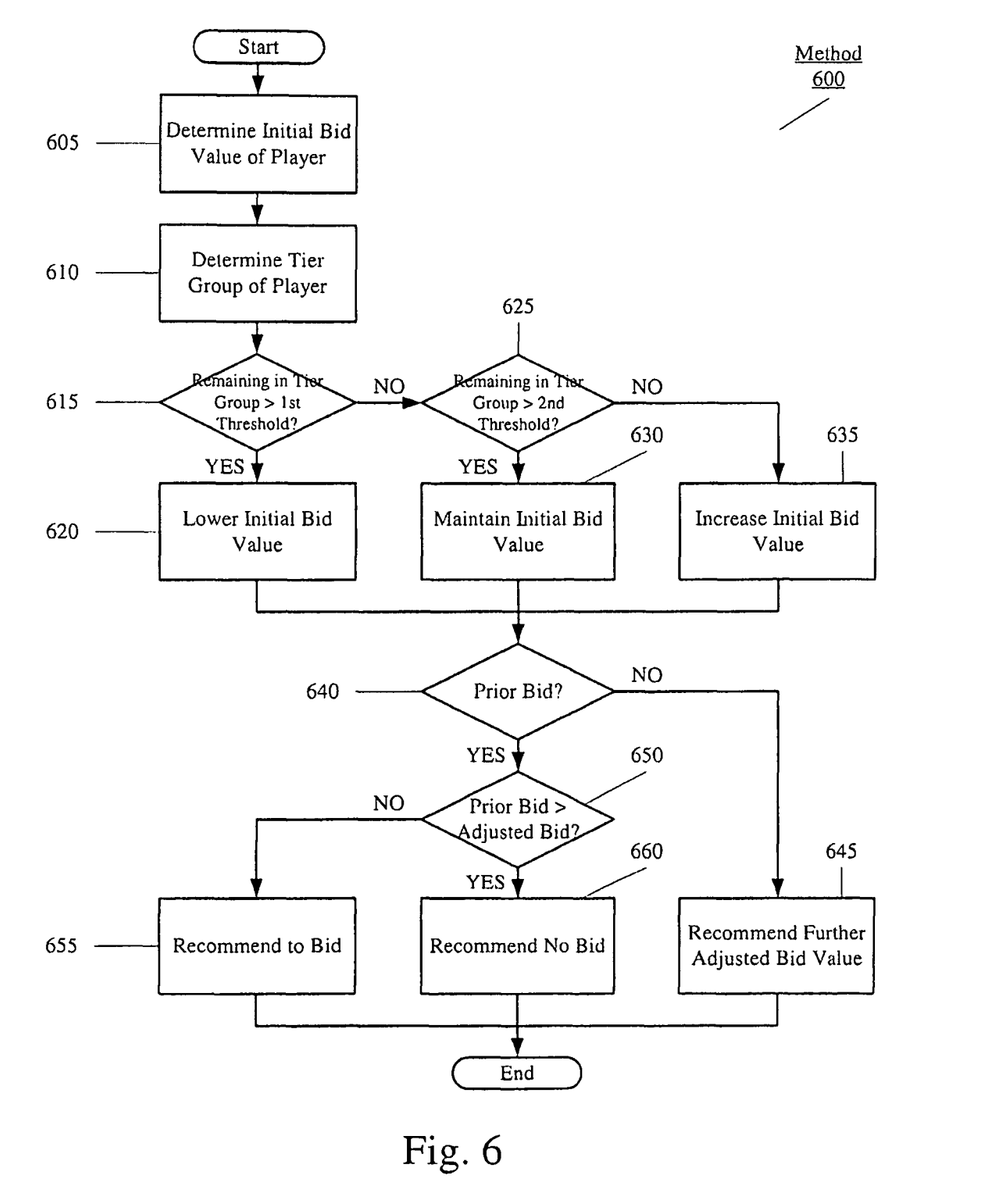
FIG. 6 shows a method 600 for generating a recommended bid for a player up for bid in a fantasy sports auction according to an exemplary embodiment of the present invention.

FIG. 6 shows a method 600 for generating a recommendation on a player up for bid in a fantasy sports application according to an exemplary embodiment of the present invention. The method 600 may be invoked when a draft has started and a player is up for bid. Furthermore, the method 600 incorporates the tier groups generated by the recommendation engine 400, for example, as illustrated in the method 500. The method 600 will be described with reference to the first exemplary embodiment in which the initial bid value is used as a basis for adjustment in order to provide the recommendation. However, as discussed above, the recommendation engine 400 may determine the recommendation using a variety of factors that may be independent of any initial bid value, whether such value was calculated beforehand or not.

In step 605, the recommendation engine 400 may determine the initial bid value of the player. As discussed above, the recommendation engine 400 may receive data regarding the initial bid value such as from the auction value provider 470. In another example, the recommendation engine 400 may receive the player data from the other processors 410, 430, 450 and determine the initial bid value. In step 610, the recommendation engine 400 determines the tier group of the player up for bid. As discussed above in the generation of the tier groups, each player may be placed in one of the tier groups and may be associated therewith along with the other players in the tier group.

In step 615, a determination is made whether the number of remaining players in the tier group is greater than a first predetermined threshold. The first predetermined threshold may be determined as a general value applied for each analysis of the players (e.g., by the administrator). For example, the recommendation engine 400 may set the first predetermined threshold to 50% of the players remaining excluding the player up for bid. Thus, if a tier group includes ten players, three of whom have already been drafted, then the percentage value of the remaining players in step 615 is 60% since six out of ten players remain undrafted if the player up for bid is excluded.

If the number of the tier group remaining is greater than the predetermined threshold, the method 600 continues to step 620. In step 620, since the recommendation engine 400 has determined that a sufficient number of players in the tier group remain and the probability that the owner will be capable of drafting a player from this tier group is high, the initial bid value that would otherwise be recommended to the owner is lowered. That is, the maximum recommended value is adjusted by being lowered. The lowering value may be determined dynamically, particularly as a function of the threshold value, the maximum recommended value, a remaining budget for bidding, etc.

Returning to step 615, if the number of the tier group remaining is less than the predetermined threshold, the method 600 continues to step 625. In step 625, a further determination is made whether the number of remaining players in the tier group is greater than a second predetermined threshold; in particular, whether or not the player up for bid is the last or one of the last players to be bid in the tier group. Accordingly, the second predetermined threshold may be a smaller percentage value than the first predetermined threshold. The second predetermined threshold may also be generated in a substantially similar manner as the first predetermined threshold. As discussed above, the determination of step 625 may be a further range or percentage of a number of remaining players. Thus, using the aforementioned example, with ten players in the tier group, the recommendation engine 400 may utilize a range of 10-30% as the second predetermined threshold so that if the remaining players are within this range, the recommendation engine 400 is configured to perform different adjustments.

It should be noted that the determination for remaining players within only the respective tier group is only exemplary. According to a preferred exemplary embodiment of the present invention, the recommendation engine 400 may evaluate the recommended bid with players remaining in other tiers, in particular, a higher tier group. Thus, a subsequent adjustment to be made to the recommended bid as described in further detail below may be affected by remaining players in a higher tier group.

If there are any remaining players in the tier group, the method 600 continues to step 630. In step 630, the recommendation engine 400 may maintain the initial bid. Specifically, the recommendation engine 400 may determine that the likelihood that the owner will be able to draft a player in this remaining tier group is decreasing, and that lowering the initial bid value will not provide the owner with a good chance to draft a player in this tier group. However, the maintenance of the initial bid value is only exemplary. As discussed above, the recommendation engine 400 may still lower or even increase the initial bid value as a function of the other factors to be considered for the owner and the team as a whole.

Returning to step 625, if there are too few available players in the tier group (less than the second predetermined threshold value), the method 600 continues to step 635. In step 635, the initial bid value is increased, since there is a decreased likelihood of drafting a remaining player, as few or even no players in this tier group remain. Again, as discussed above, a range may be used for the determination of step 625. Accordingly, to attempt to guarantee that a player in this tier group is drafted, the recommendation engine 400 may increase the initial bid value to improve the odds of the player being drafted. The increasing value may also be determined dynamically, particularly as a function of the threshold value, the maximum recommended value, a remaining budget for bidding, etc.

It should again be noted that at this stage of the method 600, the recommendation engine may provide the adjusted bid value to the owner via a graphic display of a bid number, an audio indication, etc. Using the interface of the fantasy sports application, the user may be provided with the adjusted bid value. The recommendation engine 400 may also provide the initial bid value to allow the owner to see whether the recommended adjusted bid value has been increased, decreased, or maintained.

It should also be noted that according to the preferred embodiment where the recommendation engine 400 considers players remaining in other tier groups, the adjustments made in steps 620, 630 and 635 may further be adjusted or affected. For example, step 615 may determine that the number of remaining players in the tier is below the threshold and step 625 may determine that there are no more remaining players in the tier group. However, the recommendation engine 400 may further determine that a player in a higher tier group remains. In such an example, the recommendation engine 400 may determine that the adjustment should be for maintaining the recommended bid value at the initial bid value or even lowering the recommended bid value. It should also be noted that the recommendation engine 400 may further consider the user's roster when considering players in other tier groups. For example, although a player in a higher tier group remains, if the place on the roster that the player would occupy has already been filled by other players, this may also affect the manner in which the recommendation engine 400 adjusts the recommended bid value.

After steps 620, 630, and 635, the method 600 continues to step 640. In step 640, a determination is made whether a prior bid has been made on the player up for bid. That is, another owner may have placed a bid on the player. As discussed above, the recommendation engine 400 may further incorporate a current bid in determining the recommendation. If no prior bid is available, the method 600 continues to step 645 where the recommendation engine 400 provides a further adjusted bid value. For example, the recommendation engine 400 may consider all the other factors at this point (e.g., remaining funds to bid) to adjust the bid value to an optimal amount for the owner.

Returning to step 640, if there is a prior bid, the method 600 continues to step 650. In step 650, a further determination is made whether the prior or current bid made by another owner is greater than the adjusted bid value determined in steps 620, 630, or 635. As noted above, the adjusted bid value may be a maximum bid value provided to the owner so that any bid value under the maximum indicates a better deal for the owner. Thus, if the current bid is greater than the adjusted bid (representing a maximum), the method 600 continues to step 660 where a recommendation not to bid for the player is provided. If the current bid is less than the adjusted bid, the method 600 continues to step 655 where a recommendation to bid for the player is provided.

The exemplary embodiments of the present invention provide a recommendation engine that receives player data from a plurality of different sources, such that a recommendation may be determined for an auction type draft for a fantasy sports application. The recommendation engine may group the players into tiers, and may ultimately generate a list of tiers with the players grouped accordingly. The recommendation engine may also utilize the tier groups to determine a recommendation for the owner. The recommendation may include a maximum bid value representing a highest bid value that the owner should make should the owner wish to draft the player. The recommendation may also include a basic affirmative or negative response whether to draft the player or not.

Those skilled in the art will understand that the above-described exemplary embodiments may be implemented in any number of manners, including, as a separate software module, as a combination of hardware and software, etc. For example, the recommendation engine may be a program containing lines of code that, when compiled, may be executed on a processor.

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method for a fantasy sports application, comprising:
at a host processor configured to host multiple fantasy sports drafts for multiple different fantasy sports leagues:
establishing a connection to multiple user devices, wherein each of the multiple user devices corresponds to a fantasy sports team of a fantasy sports league;
hosting a fantasy sports auction draft for the fantasy sports league, wherein the fantasy sports auction draft includes multiple selectable characters each corresponding to an athlete in a professional sports league;
receiving analyzed data from data storage, wherein the analyzed data is associated with the multiple selectable characters and used for each of the multiple different fantasy sports leagues;
determining a score value for each of the selectable characters as a function of scoring rules specific to the fantasy sports league;
grouping each of the selectable characters into one of a plurality of tiers, each of the tiers having a tier value determined based on an upper score value threshold and a lower score value threshold, the upper score value threshold and the lower score value threshold for each of the tiers being determined as a function of the score values for each of the selectable characters, wherein a set of the selectable characters are grouped into each of the tiers, each of the set of selectable characters that is grouped into one of the tiers having a score value that is greater than the lower score value threshold of the one of the tiers and less than the upper score value threshold of the one of the tiers;
receiving, from one of the multiple user devices, a request to nominate a first selectable character, when the first selectable character is nominated the host server is configured to receive one or more bids from the multiple user devices;
transmitting, to a first user device, after the first selectable character has been nominated and prior to the first selectable character being drafted by one of the multiple fantasy sports teams, data for the first selectable character including at least identity data and a first tier value corresponding to the one of the plurality of tiers into which the first selectable character is grouped;
determining, after the first selectable character has been nominated and prior to the first selectable character being drafted by one of the multiple fantasy sports teams, recommendation data specific to the fantasy sports team associated with the first user device wherein the recommendation data comprises at least a recommended bid value for the first selectable character based on a budget remaining for the fantasy sports team associated with the first user device, selectable characters previously drafted by the fantasy, sports team associated with the first user device during the fantasy sports auction draft, a total number of fantasy sports teams in the fantasy sports league, selectable characters previously drafted by other fantasy sports teams in the fantasy sports league during the fantasy sports auction draft and the scoring rules for the fantasy sports league; and transmitting the recommendation data to the first user device.

2. The method of claim 1, further comprising:

generating a list of the selectable characters, the selectable characters being presented on the list according to the tier values.

3. The method of claim 1, wherein the recommendation data is further based on a remaining number of selectable characters grouped in the same tier as the first selectable character.

4. The method of claim 1, wherein the recommendation data further includes an affirmative indication value or a negative indication value for the first selectable character.

5. The method of claim 4, wherein the affirmative indication value is determined when a current bid value is less than a maximum bid value and wherein the negative indication value is determined when the current bid value is greater than the maximum bid value.

6. The method of claim 1, wherein the recommendation data includes an initial bid value that is determined as a function of prior bid values placed by at least one fantasy sports teams.

7. The method of claim 1, wherein the analyzed data includes one of projected statistic values, current statistic values, past statistic values, and a combination thereof associated with each of the selectable characters.

8. The method of claim 1, wherein the identity data includes at least name data and position data.

9. A device, comprising:

a communication arrangement configured to communicate with multiple user devices via a communication network, wherein each of the multiple user devices corresponds to a fantasy sports team of a fantasy sports league; and a processor for a fantasy sports application, the processor configured to host multiple fantasy sports drafts for multiple different fantasy sports leagues, wherein the processor hosts a fantasy sports auction draft for the fantasy sports league, wherein the fantasy sports auction draft includes multiple selectable characters each corresponding to an athlete in a professional sports league, wherein the processor receives analyzed data from data storage, the analyzed data is associated with the multiple selectable characters and used for each of the multiple different fantasy sports leagues, wherein the processor determines a score value for each of the selectable characters as a function of scoring rules specific to the fantasy sports league, wherein the processor groups each of the selectable characters into one of a plurality of tiers, each of the tiers having a tier value determined based on an upper score value threshold and a lower score value threshold, the upper score value threshold and the lower score value threshold for each of the tiers being determined as a function of the score values for each of the selectable characters, wherein a set of the selectable characters are grouped into each of the tiers, each set of selectable characters that is grouped into one of the tiers having a score value that is greater than the lower score value threshold of the one of the tiers and less than the upper score value threshold of the one of the tiers;

wherein the communication arrangement receives a request from a one of the multiple user devices to nominate a first selectable character and communicates the request to the processor, when the first selectable character is nominated the processor is configured to receive one or more bids from the multiple user devices, wherein the processor determines, after the first selectable character has been nominated and prior to the first selectable character being drafted by one of the multiple fantasy sports teams, recommendation data specific to the fantasy sports team associated with the first user device, wherein the recommendation data includes a recommended hid value for the first selectable character based on a budget remaining for the fantasy sports team associated with the first user device, selectable characters previously drafted by the fantasy sports team associated with the first user device during the fantasy sports auction draft, a total number of fantasy sports teams in the fantasy sports league, selectable characters previously drafted by other fantasy sports teams in the fantasy sports league during the fantasy sports auction draft and the scoring rules for the fantasy sports league; and wherein the communication arrangement transmits the recommendation data to the first user device during the execution of the fantasy sports auction draft.

10. The device of claim 9, wherein the processor generates a list of the selectable characters, the selectable characters being presented on the list according to the tier values.

11. The device of claim 9, wherein processor adjusts the recommendation data is further based on a remaining number of selectable characters grouped in the same tier as the first selectable character.

12. The device of claim 9, wherein the recommendation data further includes an affirmative indication value or a negative indication value for the first selectable character.

13. The device of claim 12, wherein the affirmative indication value is determined when a current bid value is less than a maximum bid value and wherein the negative indication value is determined when the current bid value is greater than the maximum bid value.

14. The device of claim 9, wherein the recommendation data includes an initial bid value that is determined as a function of prior bid values placed by at least one of the multiple fantasy sports teams.

15. The device of claim 9, wherein the analyzed data includes one of projected statistic values, current statistic values, past statistic values, and a combination thereof associated with each of the selectable characters.

16. A non-transitory computer readable storage medium with an executable program stored thereon, wherein the program instructs a processor to perform operations comprising:

establish a connection with multiple user devices, wherein each of the multiple user devices corresponds to a fantasy sports team of a fantasy sports league;

hosting a fantasy sports auction draft for the fantasy sports league, wherein the fantasy sports auction draft includes multiple selectable characters each corresponding to an athlete in a professional sports league and wherein the processor is configured to host multiple fantasy sports drafts for multiple different fantasy sports leagues;

receiving analyzed data from data storage, wherein the analyzed data is associated with the multiple selectable characters and used for each of the multiple different fantasy sports leagues;

determining a score value for each of the selectable characters as a function of scoring rules specific to the fantasy sports league;

grouping each of the selectable characters into one of a plurality of tiers, each of the tiers having a tier value determined based on an upper score value threshold and a lower score value threshold, the upper score value threshold and the lower score value threshold for each of the tiers being determined as a function of the score values for each of the selectable characters, wherein a plurality of the sport players are grouped into each of the tiers, each of the selectable characters that is grouped into one of the tiers having a score value that is greater than the lower score value threshold of the one of the tiers and less than the upper score value threshold of the one of the tiers;

receive, from one of the multiple user devices, a request to nominate a first selectable character, when the first selectable character is nominated the processor is configured to receive one or more bids from the multiple user devices;

providing data for the first selectable character including at least identity data and the corresponding tier value;

determining, after the first selectable character has been nominated and prior to the selectable character being drafted by one of the multiple fantasy sports teams, recommendation data specific to the fantasy sports team associated with the first user device, wherein the recommendation data comprises at least a recommended bid value for the first selectable character based on a budget remaining for the fantasy sports team associated with the first user device, selectable characters previously drafted by the fantasy sports team associated with the first user device during the fantasy sports auction draft, a total number of fantasy sports teams in the fantasy sports league, selectable characters previously drafted by other fantasy sports teams in the fantasy sports league during the fantasy sports auction draft and the scoring rules for the fantasy sports league; and transmitting the recommendation data to the first user device.

* * * * *

UNITED STATES PATENT AND TRADEMARK OFFICE
CERTIFICATE OF CORRECTION

PATENT NO.         : 10,940,395 B2
APPLICATION NO.    : 14/757978
DATED              : March 9, 2021
INVENTOR(S)        : Sloan et al.

Page 1 of 1

It is certified that error appears in the above-identified patent and that said Letters Patent is hereby corrected as shown below:

In the Claims

Claim 1, Column 13, Lines 3:
"characters previously drafted by the fantasy, sports" should read "characters previously drafted by the fantasy sports"

Claim 9, Column 14, Lines 20:
"includes a recommended hid value for the first" should read "includes a recommended bid value for the first"

Claim 11, Column 14, Lines 37:
"The device of claim 9, wherein processor adjusts the" should read "The device of claim 9, wherein the"

Signed and Sealed this
Sixth Day of July, 2021

Drew Hirshfeld
*Performing the Functions and Duties of the*
*Under Secretary of Commerce for Intellectual Property and*
*Director of the United States Patent and Trademark Office*